June 2, 1970
H. M. GEYER
3,515,033
ACTUATORS
Original Filed July 5, 1966
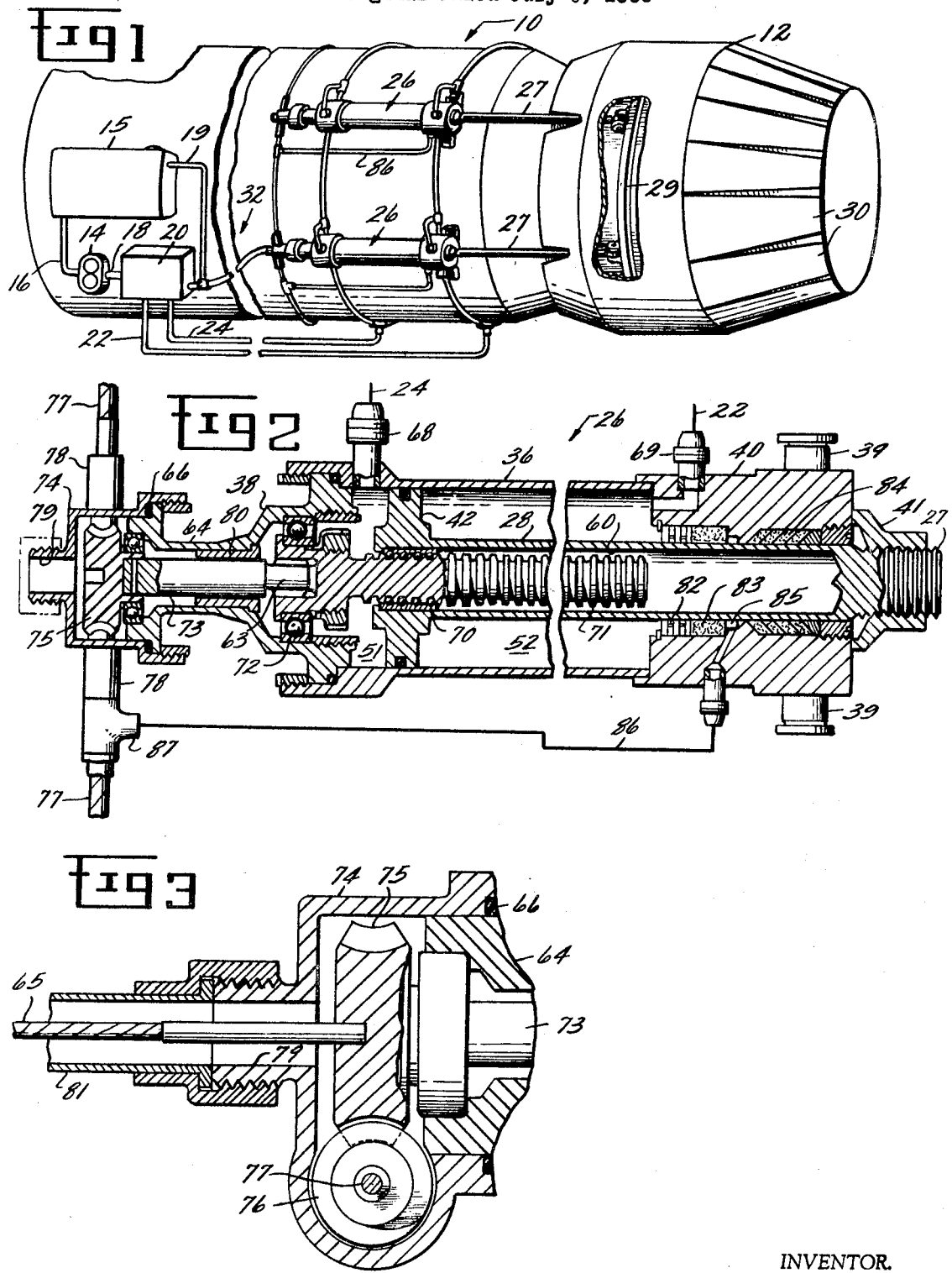
INVENTOR.
HOWARD M. GEYER
BY
ATTORNEY United States Patent Office 3,515,033
Patented June 2, 1970

3,515,033
ACTUATORS
Howard M. Geyer, Dayton, Ohio, assignor to General
Electric Company, a corporation of New York
Continuation of application Ser. No. 562,914, July 5,
1966. This application Oct. 15, 1968, Ser. No. 768,223
Int. Cl. F01b 3/00, 21/02; F01p 3/12
U.S. Cl. 92—33                                    4 Claims

ABSTRACT OF THE DISCLOSURE

A plurality of hydraulic, piston type actuators are employed to control movement of the primary exhaust nozzle of a gas turbine engine. Each actuator is provided with a threaded shaft which is rotated in response to movement of the piston. The threaded shafts of the several actuators are interconnected and a flexible shaft connection is provided from one actuator shaft to a control device. The angular position of the flexible shaft provides a signal to the control device indicating the position of the piston and, therefore, the extent of opening of the exhaust nozzle. The interconnected shafts also provide for synchronizing of the piston positions. The opposite ends of each piston are alternately pressurized and vented to displace the pistons in one direction or another. There is a continuous bleed of hydraulic fluid from the opposite ends of the pistons back to conduit structure which surrounds the interconnecting means and the flexible shaft connection to the nozzle area control, whereby there is continuous cooling of the signal transmitting means as well as lubrication thereof by low pressure fluid.

---

This application is a continuation of application Ser. No. 562,914, filed July 5, 1966, and now abandoned.

The present invention relates to improvements in actuators and more specifically to improvements in actuators employed in high temperature environments.

The use of gas turbine engines for the propulsion of aircraft at supersonic speeds has generated numerous problems in the functioning of engine components. One of the more significant problems is the high environmental temperatures in which the engine components function when the aircraft is traveling at a supersonic speed. The usual hydraulic fluids used to lubricate and/or power mechanical engine components, such as actuators, tend to coke at these temperatures, i.e., form a hard precipitate, which interferes with or prevents normal operation of the mechanical parts.

The problem is aggravated where actuators are employed for positioning an exhaust nozzle of a gas turbine engine. In most, if not all, instances a position feedback signal from the actuator and the nozzle connected thereto must be transmitted to a computer or control device. The position signal is utilized by the computer in controlling the position of the actuator when the position signal is transmitted to the computer by a mechanical device; lubrication is generally essential. This lubricant is also subjected to a relatively high environmental temperature which may cause it to coke and impair the functioning of the mechanical position sensing device.

In the control of an exit throat nozzle it is further desirable that a plurality of synchronized actuators be employed. The problems of coking are of equal significance in such a system as well.

Accordingly, an object of the present invention is to minimize temperature of fluid used for lubricating a mechanical position transmitting device employed with an actuator used in a high temperature environment and thereby minimize, if not eliminate, coking of the fluid.

Another object is to minimize the temperature of fluid used for lubricating a mechanical position transmitting device employed with a plurality of actuators that are interconnected for synchronizing their movement, thereby to minimize, if not eliminate, coking of the fluid.

The above ends are achieved by providing an actuator comprising a cylinder having reciprocable therein a piston. Means are provided for introducing pressurized fluid therein as are shaft means extending from the actuator to a remote location. The shaft means are connected to and movable in response to displacement of the piston whereby the displacement of the shaft means is proportional to the displacement of the piston. A conduit is provided for surrounding the shaft means, the conduit having a discharge therefrom near the remote location. Means for providing a continuous relatively low flow of fluid from the cylinder through the conduit to the discharge are provided, whereby the fluid lubricates the shaft means in the conduit, and when the actuator is operated in a relatively high temperature environment, the temperature level of the fluid in the conduit is minimized.

Preferably the above described actuator is employed in combination with at least one other actuator having similar elements with the exception of the conduit and the shaft means extending to a remote location. The pistons of the actuators are interconnected for synchronizing their movement and means are provided for forming a passageway from the cylinder of the last mentioned actuator to the conduit whereby the flow of fluid from the last mentioned actuator insures a continuous flow of fluid through the conduit.

In the drawing:
FIG. 1 illustrates in abbreviated fashion a control system for a gas turbine engine exhaust nozzle in which the present invention is embodied;
FIG. 2 is a longitudinal section of an actuator seen in FIG. 1; and
FIG. 3 is a fragmentary longitudinal section of an actuator seen in FIG. 1 showing a mechanical position transmitting device.

FIG. 1 shows a nozzle area control system for an exhaust nozzle 12 of a gas turbine engine 10. The nozzle area control system comprises a pump 14 which receives hydraulic fluid from a tank 15 through a conduit 16 and pressurizes the fluid for delivery through a conduit 18 to a control device 20. The control device 20 is adapted to selectively direct hydraulic fluid through a pair of conduits 22, 24 to a series of actuators 26. Piston rods 28 extend from the actuators 26 and are coupled to rods 27, secured to an axially translatable ring 29. The ring 29 is connected by suitable mechanical linkage to a plurality of pivotable flaps 30 defining the area of the exhaust nozzle 12.

Flow of fluid to the actuators 26 displaces the piston rods 28 to pivot the flaps 29 and control the area of the exhaust nozzle 12 in the usual fashion.

The piston rods 28 may be mechanically interconnected, as taught by my U.S. Pat. 2,657,539, issued Nov. 3, 1953, to synchronize their travel, thus preventing distortion of the ring 29. The means providing this mechanical interconnection, which will be discussed later in greater detail, has a mechanical connection shown generally by reference character 32, to the controller 20 for providing a signal for control purposes that reflects the actual position of the flaps 29.

Referring now to FIG. 2, each actuator 26 is comprised of a cylinder 36 having a head end cap 38 and a rod end cap 40 through which the piston rod 28 extends. Trunnions 39 provide a convenient means with which to mount the actuator on the engine 10. A piston 42, reciprocable in the cylinder 36, is secured to the piston rod 28 and divides the cylinder into extend and retract chambers 51, 52. A collar 41 provides means to limit the retract travel of the piston 42. Suitable fittings 68, 69 telescoped into the interior of cylinder 36 provide a connection between the chambers 51, 52 and the conduits 22, 24 of FIG. 1.

The means for mechanically interconnecting the piston rods 28 comprise a nut 70 fixed in a hollow bore 60 of the piston rod 28. A threaded shaft 71 is journaled in the head end cap 38 for rotary motion only by means of a ball bearing 72 and threadably engages the ball nut 70. A suitable universal coupling 63 connects the shaft 71 to a shaft 73 extending through an extension portion 64 of the head end cap 38 which is secured to a housing 74 at a seal 66. The shaft 73 is suitably coupled to a worm wheel 75 journaled in the housing 74. The worm wheel 75 drives a high lead worm 76, also journaled in the housing 74, as shown in FIG. 3. The worms 76 of each actuator 28 are interconnected by a flexible cable 77 disposed in a conduit 78 which provides an interconnection between the housings 74.

Thus, when a pressure differential is applied across the pistons 42 to urge them into motion by the introduction of pressurized hydraulic fluid into chambers 51, 52, the nut 70 cooperates with the threaded shafts 71 to cause the worms 76 of each actuator 28 to rotate. The flexible cable 77 constrains the worms 76, to rotate in synchronism which causes the piston rods 28 to reciprocate in unison.

It is apparent that the rotational displacement of the worm wheels 75 reflects the position of the flaps 29, thereby providing a mechanical position signal. This signal is applied to the controller 20 for control purposes by the mechanical connection 32, previously referred to. The mechanical connection 32, shown in FIG. 3, comprises a flexible cable 65 secured to the worm wheel 75 of one of the actuators 28 and extending through an opening 79 of the housing 74 to a suitable receiving device (not shown) in the controller 20. A conduit 81 sealingly secured to the housing 74 provides a housing for the flexible cable 65.

The means now to be described provide a source of lubricating fluid for the flexible cable 65 while at the same time preventing temperature buildup of the fluid, as can result when the actuators are operated in a high temperature environment. A sleeve 80 is mounted in the extension portion 64 of the head end cap 38 and surrounds the shaft 73. The housings 74, the interconnecting conduits 78, and the conduit 81 are maintained at a relatively low pressure relative to that in extend chamber 51 by providing a connection between the conduit 81 and the tank 15 through a conduit 19 (FIG. 1). If all of the actuators 26 have an opening 79 for manufacturing convenience, it is desirable to provide a cap thereon, shown in phantom in FIG. 2, to make the conduit 81 the only drain passage from the synchronizing housings and conduits.

A sufficient clearance is provided between the sleeve 80 and the shaft 73 so that at all times the pressure in the chamber 51 causes a relatively low flow of hydraulic fluid through the sleeve 80 and the resistance of the shaft 73 in rotation is minimized. The hydraulic fluid passes to the housings 74 of the several actuators and circulates through the conduits 78 to the conduit 81. The fluid then passes through the conduit 81 to both cool and lubricate the flexible cable 65 before being discharged into the tank 15 through the conduit 19.

The above arrangement provides sufficient flow through the conduit 81 when the piston rod 28 is urged towards an extend position. However, when the piston rod 28 is urged towards a retract position, the pressure in chamber 51 may be reduced to a level which creates a relatively low pressure differential across the sleeve 80. This reduced differential is sufficient to maintain flow through the extension portions 64 of the head end caps but may result in a very slow flow rate through the conduit 81, especially when the conduit 81 is relatively long.

In order to maintain a substantially constant flow through the conduit 81 at all times, a second source of low pressure hydraulic fluid is provided. A seal 84 is secured in the rod end cap 40 of each actuator 26 to sealingly surround the piston rod 28. A seal 82 and rod guide 83 are also disposed in the rod end cap 40 to surround the piston rod 28. An annular groove 85 is provided between the seal 82 and the seal 84. The annular groove 85 is connected to the interconnecting conduit 78 by a conduit 86 at a suitable T connection 87. A sufficient clearance is provided between the seal 82 and the piston rod 28 so that at all times a relatively low flow of hydraulic fluid passes from retract chamber 52 through conduits 86, 78 to the conduit 81. When the piston rods 28 are urged towards a retracted position, the flow of hydraulic fluid from the chamber 52 maintains constant flow through the conduit 81.

It is apparent that the provision of relatively low flows of hydraulic fluid from the extend and retract chambers 51, 52 past the sleeves 80 and seal 82 insures a constant flow through the conduit 81 which prevents a substantial increase of the fluid temperature therein under all actuator operating conditions. By minimizing the temperature of the fluid in conduit 81, the tendency of the hydraulic fluid to coke is reduced, if not eliminated.

The sleeve 80 and seal 82 also provide several ancillary benefits. By maintaining the fluid pressure in conduit 81 at a relatively low level, the stresses in the conduit walls are minimized, thereby permitting the use of a relatively thin-walled conduit which may be easily bent to conform to the casing of the engine 10. Additionally, the maintenance of a low pressure in the housings 74 minimizes leakage across the seal 66, which is a large diameter seal and prone to leakage when subjected to high pressures.

A further benefit is realized by the use of the sleeve 80 and seal 82 in actuators used for controlling the area of an exhaust nozzle of a gas turbine engine. It has been found that when the loads on the actuators are highest, the temperature of the actuator environment is highest. During this condition the flow of hydraulic fluid must be increased to prevent substantial temperature buildup. The provision of fixed clearances across the sleeve 80, and seal 82, provides for an increase in flow because the pressures in chambers 51 and 52 are increased to provide an increased pressure differential.

In its broader aspect the present invention is not limited to use with a plurality of actuators employed in a nozzle area control system for a gas turbine engine but may be used with an actuator having shaft means for mechanically transmitting the actuator position to a remote location, particularly where the actuator is employed in a control system operating in a high temperature environment.

Having thus described the invention, what is claimed as novel and desired to be secured by Letters Patent of the United States is:

1. An actuator comprising:
   a cylinder having a piston reciprocal therein, said piston defining an extend chamber and a retract chamber in said cylinder,
   first connecting means for connecting said extend chamber with a first conduit,
   second connecting means for connecting said retract chamber with a second conduit,
   a third conduit,
   bearing means supported in said cylinder,
   shaft means movably supported in said bearing means and extending from said actuator to a remote location, said shaft means including a threaded portion journaled in said bearing means for rotation only, a flexible shaft portion disposed in said third conduit, and a coupling shaft axially aligned with said flexible shaft portion and said threaded shaft portion,
   said threaded portion threadably engaging said piston for rotation in response to displacement of the piston whereby said remotely extending flexible shaft portion has a rotational displacement proportional to the displacement of said piston, said cylinder further comprising at one end thereof an end housing through which said shaft means extends, said end housing having an opening to said third conduit, and means for throttling a continuous relatively low flow of fluid from either of said extend or retract chambers to a pressure in said third conduit which is low relative to the actuation pressure in said cylinder, said means for throttling fluid through said end housing includes a sleeve mounted in said end housing for surrounding said coupling shaft, the inner side of said sleeve being exposed to the pressurized fluid in said extend chamber, said coupling shaft and said sleeve having a clearance therebetween such that the pressure in said extend chamber causes a relatively low flow of fluid across said sleeve to said third conduit.

2. An actuator as in claim 1 wherein,
said actuator includes,
a rod secured to said piston and extending through said retract chamber and outwardly from the end of said cylinder,
said means for providing a flow path from said retract chamber comprises,
a pair of seals axially spaced from one another through which said rod extends,
a passageway extending from between the seals to said third conduit,
one of said seals being exposed on one side to the pressurized fluid in said retract chamber, and
said rod and said seal exposed to the pressurized fluid in said retract chamber have a clearance therebetween for further forming said flow throttling means such that the pressure in said retract chamber causes a relatively low flow of fluid to said passageway and to said third conduit.

3. An actuator as in claim 1 in combination with at least one other actuator which comprises,
a cylinder having a piston reciprocable therein, said piston defining an extend chamber and a retract chamber in said cylinder,
means for connecting said extend chamber with a first conduit,
means for connecting said retract chamber with a second conduit,
bearing means supported in said cylinder,
a threaded shaft journaled in said bearing means for rotation only, said threaded shaft threadably engaging said piston for rotation in response to displacement of said piston,
an end housing at one end of said cylinder,
a second bearing means supported in said end housing,
a coupling shaft journaled in said second bearing means and coupled to said threaded shaft,
a sleeve mounted in said end housing for surrounding said coupling shaft, the inner side of said sleeve being exposed to the pressurized fluid in said extend chamber, said coupling shaft and said sleeve having a clearance therebetween such that the pressure in said extend chamber causes a relatively low flow of fluid across said sleeve to its outer end,
a rod secured to said piston and extending through said retract chamber and from the second end of said cylinder,
restricted passageway means for providing a relatively low flow of fluid from said retract chamber to a point exterior thereof;
said combination including,
means for interconnecting the coupling shaft of said first mentioned actuator with the coupling shaft of said second mentioned actuator,
a fourth conduit surrounding said coupling shaft interconnecting means between said end housing, said fourth conduit being connected to said housings at a point exterior to the outer ends of each said sleeve to form a passageway between said housings, and
a passageway connecting said restricted passageway means with said fourth conduit.

4. An actuator as in claim 1 in combination with,
a source of pressurized fluid, said source including pumping means and a tank at relatively low pressure,
control means for selectively pressurizing said extend chamber and said retract chamber relative to its opposite, said control means being hydraulically connected to said source of pressurized fluid,
a first conduit connecting the said control means to the said first connection means and a second conduit connecting the said control means to the said second connection means,
wherein the said shaft means is interconnected at its remote end with the said control means and the said third conduit is connected to the housing for said control means, and wherein the said combination includes means for connecting the remote end of said third conduit to said tank.

References Cited

UNITED STATES PATENTS 3,045,650   7/1962   Ambrosini _____ 92—86 X

MARTIN P. SCHWADRON, Primary Examiner

I. C. COHEN, Assistant Examiner

U.S. Cl. X.R.

92—86, 76; 60—97